April 28, 1931.  F. G. KEYES  1,802,516
METHOD OF AND APPARATUS FOR PRODUCING REFRIGERATION
Filed March 22, 1927   3 Sheets-Sheet 2
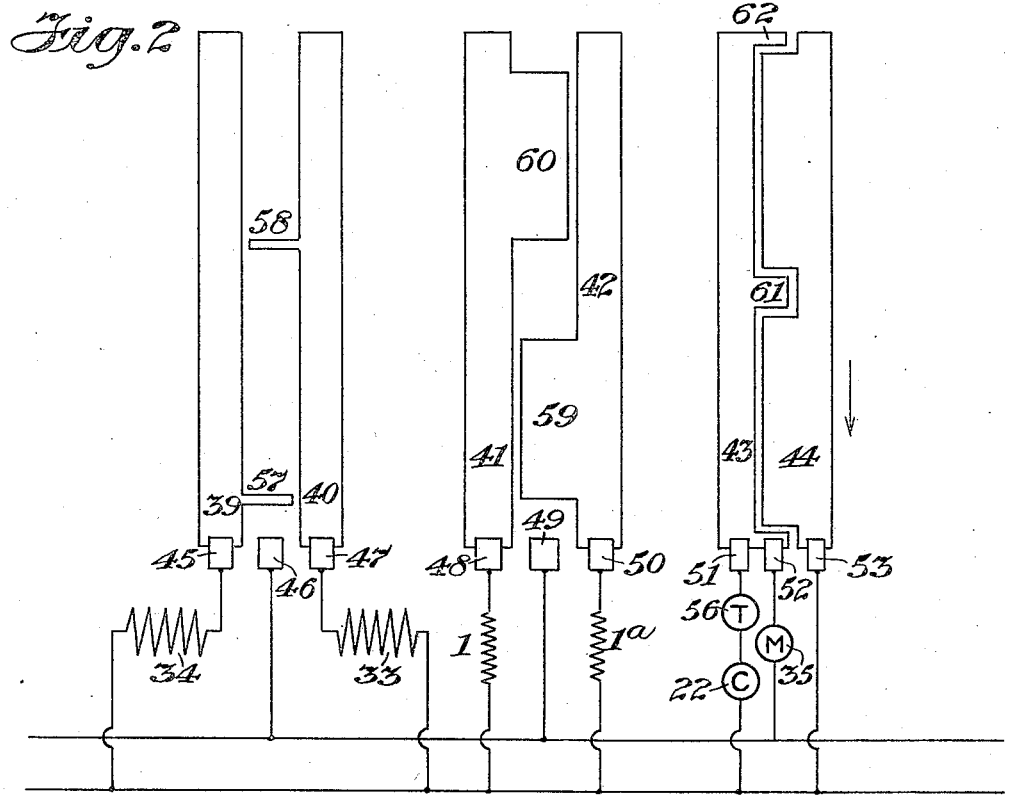
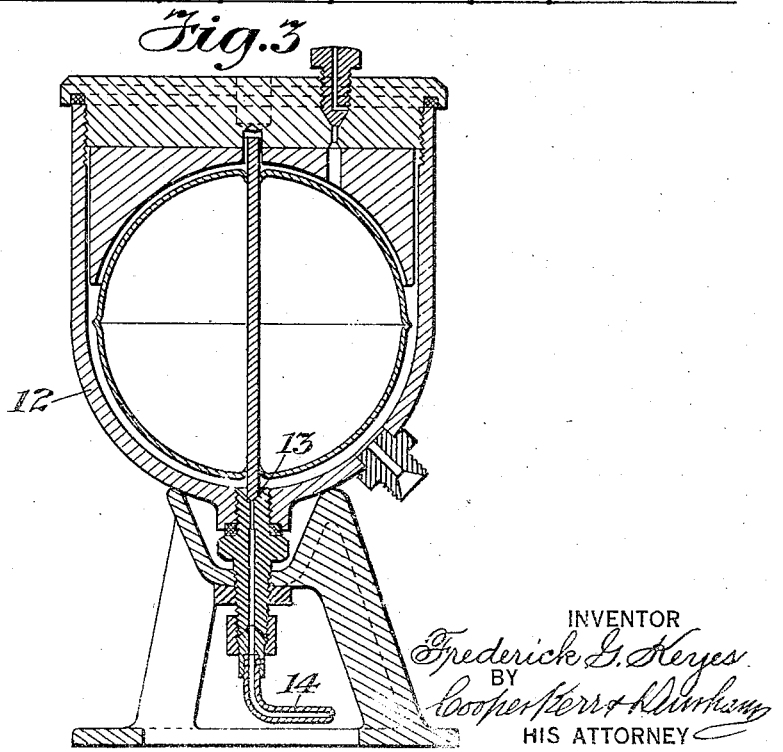
INVENTOR
Frederick G. Keyes
BY
Cooper Kerr & Dunham
HIS ATTORNEY April 28, 1931.  F. G. KEYES  1,802,516
METHOD OF AND APPARATUS FOR PRODUCING REFRIGERATION
Filed March 22, 1927  3 Sheets-Sheet 3

INVENTOR
Frederick G. Keyes
BY
Cooper, Kerr & Dunham
HIS ATTORNEY

Patented Apr. 28, 1931

1,802,516

UNITED STATES PATENT OFFICE

FREDERICK G. KEYES, OF CAMBRIDGE, MASSACHUSETTS, ASSIGNOR, BY MESNE ASSIGNMENTS, TO FRIGIDAIRE CORPORATION, A CORPORATION OF DELAWARE

METHOD OF AND APPARATUS FOR PRODUCING REFRIGERATION

Application filed March 22, 1927. Serial No. 177,238.

My invention relates to methods of and apparatus for producing refrigeration.

One method comprises operating a generator-absorber alternately as a generator for a given period of time and then as an absorber acting at a rate to produce the desired refrigeration and delaying the initiation of distilling in the generator-absorber until it has absorbed the desired amount of refrigerant from the evaporator.

Another method which I have found of advantage comprises the utilization of two generator-absorbers operating in alternation to supply refrigerant in liquid form to an evaporator common to the generator-absorbers to insure a supply of refrigerant in the evaporator practically at all times and that while one of the generator-absorbers is supplying refrigerant to the evaporator, the other one is absorbing the refrigerant from the evaporator and continuous refrigeration is thus produced in the neighborhood of the evaporator.

Another method comprises interrupting the cyclic operation at the end of the distilling period of one of the generators in the event the rate of absorption of the absorber diminishes for any reason, maintaining the interruption until absorption is completed by the absorber, and controlling the action of the absorber-generators through the medium of the liquid level of the refrigerant in the evaporator to the end that each absorber takes up only its share of the refrigerant and even distribution of the refrigerant is insured in each and successive cycles of operation.

Another method comprises interrupting the cyclic operation at the end of the absorbing period of one of the generators in the event the temperature of the evaporator reaches a point where continued production of refrigeration would serve no useful purpose by availing of the action of a thermostat to open at the predetermined temperature of the evaporator and break the circuit controlling the operation of the generators. For example, in the event that at any period of absorption of one of the generators the temperature of the evaporator falls below a predetermined setting of the thermostat distillation or generation of refrigerant is prevented until both the thermostat closes and the lower contacts in the evaporator are closed, at which time the system will start up where it left off.

In the accompanying drawings is shown by way of illustration, a new and novel apparatus of my invention for carrying out the above methods and suitable new and novel means are provided therein for practicing the various steps thereof, as desired, and in which Figure 1 is a schematic view of a refrigerating apparatus showing the devices and circuits for controlling the cyclic operation of the apparatus by means of brushes and contact pieces mounted on a drum rotated by a constant speed motor controlled by the liquid level of the refrigerant in the evaporator.

Figure 2 shows the lateral arrangement of the contact pieces on the drum, said circular pieces being shown developed into a plane for convenience.

Figure 3 shows in section a form of liquid valve and condensing chamber for insuring that refrigerant in liquid form only is passed to the evaporator.

Figure 1:
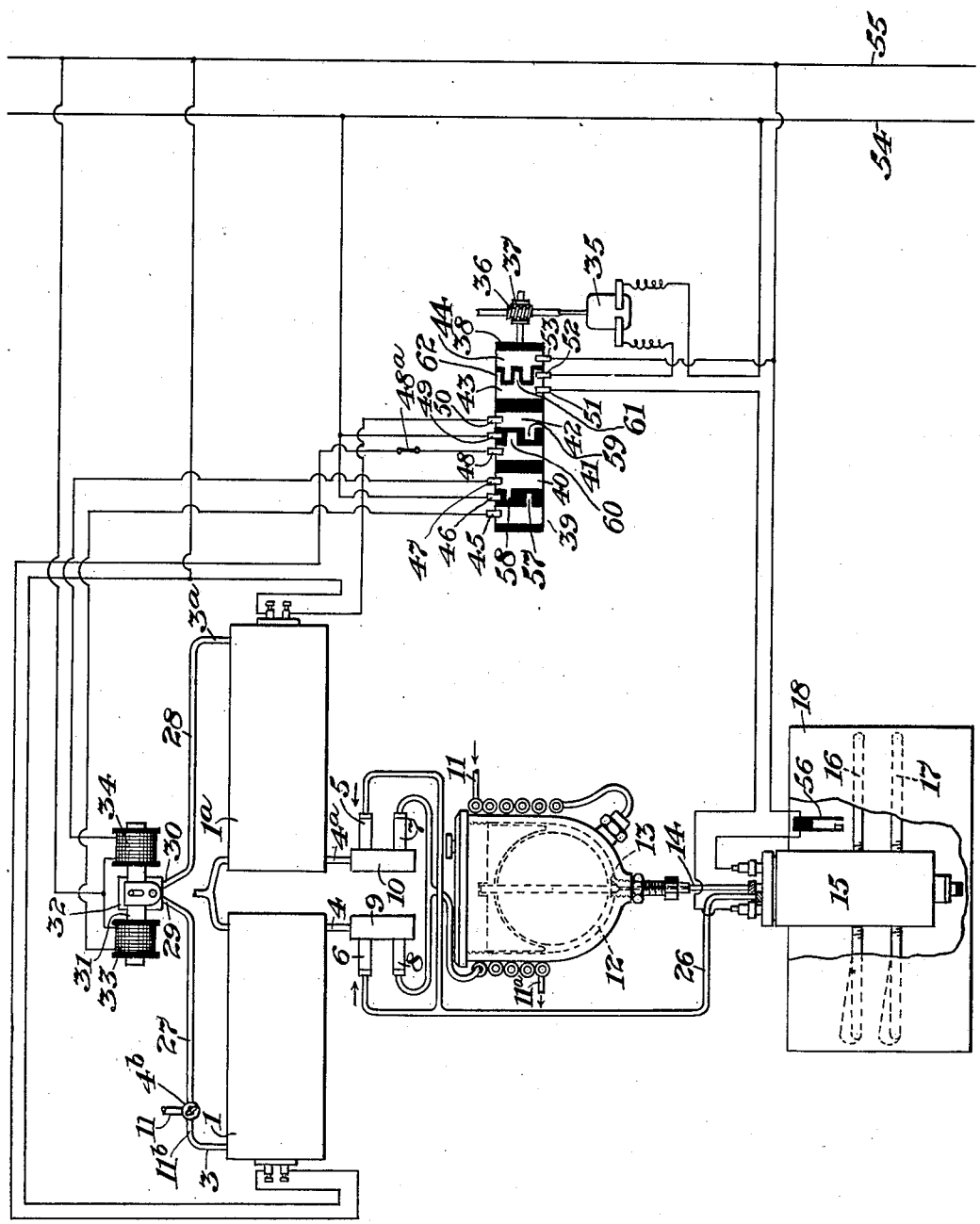
Figure 4:
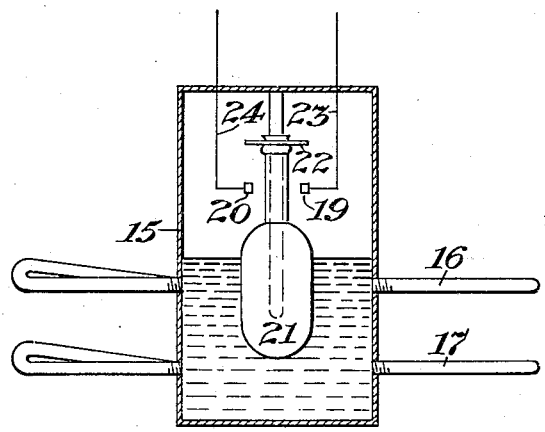
Figure 4 is a vertical section of the evaporator showing the details of the float and contacts for controlling the initiation of the distilling part of the operating cycle.

Referring to Fig. 1 there is presented a plan of the new refrigerating apparatus or system wherein 1 and 1a represent the two separate generator-absorbers. Each generator is provided with an electric or other heating means 2 and each also with a pipe 3 wherein cooling water may be circulated (see Fig. 5). While the heating means is, in this description, electrical, it is to be understood that the heat energy required may be obtained by the combustion of gas, oil or other fuel. There exists on the market devices for applying these latter fuels which may be controlled by electrical means as shown for example in my application Serial No. 678,538, and, thereby employed readily by those skilled in the art. Each generator in addition to being provided with its own heating means and cooling means is also provided with its individual outlet 4 and 4a to which is joined a manifold 9 and 10. The manifolds carry attached thereto two check valves 5 and 7, and 6 and 8, 5 and 6 constituting return check valves and 7 and 8 outlet check valves.

The condenser 11 consists for example of a compound tube the inner of which receives the refrigerant to be condensed, the annular space constituted of the outside of the inner tube and the inside of the concentric tube serving as space through which the cooling or condensing water circulates. From the condenser the condensed refrigerant passes into the liquid valve or chamber 12 wherein upon the accumulation of sufficient liquid the valve 13 lifts allowing a portion of the liquid refrigerant to pass by way of the pipe 14 into the collecting chamber or evaporator 15 and the evaporator coils 16, 17 contained in the brine tank 18. The brine tank contains the thermostat 56 of such design that the circuit therethrough is closed unless the temperature of the brine drops below a predetermined point.

The evaporator 15 is provided with two electrically insulated contacts 19, 20 so adjusted as to permit contact with the contacting disc 22 carried by the float 21. The adjustment of float-contacting-disc 21, 22 and the length of contact arms 23, 24 is such that contact is made when the chamber 15 and evaporator coils 16, 17 are empty or practically empty of refrigerant.

From the evaporator head a pipe 26 leads to the check valves 5 and 6 of generators 1 and 1a. This return pipe provides for the return of vaporized refrigerant from the evaporator coils to either generator 1 or generator 1a depending on which generator is acting as absorber.

The pipes 27 and 28 for conveying water alternately to the generators are connected to the ports 29, 30 of the water valve 31. The inlet to the water valve 31 is connected through the top thereof and shown at 32. The water valve serves, when actuated by the solenoids 33, 34 to cause water to pass to generator 1 or to generator 1a as determined by the control system of the apparatus.

The mode of control of the cycle of operations of the refrigerating machine is electrical and depends on the use of a motor 35 which is a constant speed motor and well known in the electrical art. The motor, 35, is connected by means of a worm 36 and wheel 37 to cause the rotation of a drum or cylinder 38 upon the surface of which are flush contact members 39, 40; 41, 42; 43, 44; arranged in pairs. The exact forms of these contact pieces are represented in Figure 2, the description of which will appear below. The contact cylinder or drum 38 has bearing on its contact pieces brushes or contactors 45, 46, 47; 48, 49, 50; 51, 52, 53 arranged in groups of three corresponding to the three pairs of cylindrical flush contact pieces 39, 40; 41, 42; 43, 44.

The electrical line or main is represented by 54, 55. From the main connection is made to either coil of the water valve 31 through brushes 46, 47 or 46, 45. Electrical energy is supplied to either generator heating means by (means of) brushes 49, 48 or 49, 50. The motor circuit may be energized by current passing either through thermostat 56; contacts 19, 20 and disc 22 and brushes 52, 51 or directly through 52, 53 depending on the position of the cylinder 38.

The arrangement of the contacting members carried by the drum or cylinder 38 will be readily seen by referring to Fig. 2 wherein each circular contact member is developed in a plane. The pieces 39, 40; 41, 42; 43, 44 are of brass or other suitable conducting substance mounted upon a cylinder of insulating material. In any event the contacting pieces must be well insulated one from the other.

Figure 2 is drawn to place each contact piece 39, 40; 41, 42; 43, 44 in relatively correct positions. The revolution of the drum or cylinder 38 may be duplicated in its effect by using flat contact pieces and drawing the contact pieces repeatedly downward under the brushes 45, 46, 47 etc.

The rate of revolution of the contact cylinder 38 is adjusted to make one complete revolution in the time required for the distillation of both generators successively. It will be assumed that each generator requires 45 min. to complete its delivery of refrigerant; the time of one complete revolution of 38 will then be 90 minutes. The adjustment of the time may evidently be made at will by a suitable choice of the worm and wheel 36, 37.

Experience has shown that the evolution of refrigerant from a heated generator proceeds for some time after the source of heat has been cut off. Advantage has been taken of this fact in the design of the cylinder contacts 41, 42 in such a way that heat is supplied directly, for example, for 35 minutes leaving a period of ten minutes, for example, before the water valve, controlled by contact members 39, 40 is caused to transfer water from the absorbing generator to the generator in the heating cycle.

The contact pieces 43, 44 control the operation of the motor 35 only and the preferred operation requires as stated above, that either generator having been started into its heating cycle must continue until normal distillation is completed. The desired result is obtained by the arrangement of the contact pieces 43, 44 as shown in Fig. 2. To indicate the functioning of the apparatus assume generator 1 to have completed that part (35 minutes) of the heating cycle during which the heating resistance is supplied with energy and continued rotation of the drum for ten minutes will bring extension 57 of contact 39 into electrical connection with brush 46, thereby energizing magnet coil 34 and directing water into generator No. 1.

When brush 49 makes contact with extension 59 of contact piece 42, generator No. 1a will receive its supply of heat. Assume that during the heating cycle of generator 1a one of the three following conditions exist:

(1) (a) Thermostat 56 circuit open (temperature too low).

(b) Disc contact 22 closed (ammonia absorbed as fast as delivered).

The motor 35 will continue to revolve the cylinder 38, current passing through brush 53 through contact 44 to brush 52. The motion will continue therefore until brush 52 leaves 44 and makes contact with extension 61 of 43, the brushes, in this case, being wide enough to bridge the insulating gap. Since by condition (1) (a) the thermostat circuit is open, no current can be supplied to the motor, and generator 1 will not begin distillation until the brine warms sufficiently to close the thermostat contact 56 whereupon the motor starts and extension 60 of contact piece 41 completes the circuit to the heating means supplying generator 1.

(2) (a) Same state of contacts as before in discussion of (1), i. e., thermostat open (temperature too low).

(b) Disc contact open (supply of refrigerant from distilling generator sufficient to lift disc 22 from contacts 19, 20).

As in (1) distillation will continue until extension 61 of 43 is under the brush 52. Generator 1 will not begin to distill until refrigerant is exhausted or absorbed by generator No. 1 and the temperature has risen to the point where the thermostat contacts and disc contacts close.

(3) Same state of contacts as before discussion (1).

(a) Thermostat circuit closed (brine tank temperature higher than predetermined low limit).

(b) Disc circuit open (refrigerant supplied faster than it is absorbed).

Distillation will continue until extension 61 of contact 43 is under the brush 52 when the circuit formed by the contacting of disc 22 with contacts 19 and 20 is required before current can pass through the motor by way of brushes 51, 52 disc contact 19, 20, thermostat contact 56. The generator 1 cannot therefore start heating until its full quota of ammonia is absorbed.

The case where both thermostat contact and disc control remain closed (starting a dead machine) clearly permits the machine to function at its maximum speed—one generator beginning absorption where the other leaves off and continuing to exchange roles successively as absorber and generator. This continues until either refrigerant collects faster than absorbed during the distillation cycle of one of the generators (case 3) or the temperature drops to the point where the thermostat contacts open (case 2 or case 1).

While I have described my invention in connection with alternately operating generator-absorbers which may be air or water cooled, it is to be understood that it is applicable to a single generator absorber in which event, if the apparatus is water cooled, the water pipe 27 will be disconnected from generator 1 and connected to coil 11 by a valve 11b in order that cooling water is supplied to the condenser in alternation with that supplied to generator 1a and the brush 48 is disconnected by opening switch 48a.

Figure 5:
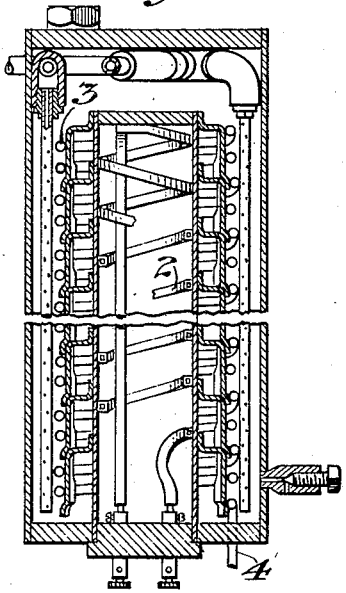
Figure 5 is a vertical view in section of a generator-absorber, showing the details of construction thereof; and, Figure 6 is a plan view of the device of Figure 5.
Figure 6:
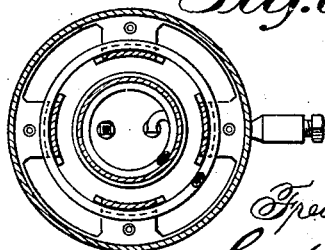

The generator-absorbers shown in detail in Fig. 5 contain a material for absorbing the refrigerant, and this material is, as desired, one of the materials described in my application Ser. No. 673,103, filed November 6, 1923, or calcium chloride, or strontium chloride, or any of the amine forming salt compounds of the second groups, alone or in combination with each other.

I claim:

1. The method of producing refrigeration which consists in distilling and redistilling a refrigerant and passing the distilled refrigerant into an evaporating device, evaporating the refrigerant and passing it back to be distilled again, continuing each distillation after its initiation for a definite time period to cause the distillation of a definite amount of refrigerant, and utilizing the liquid level of the distilled refrigerant and the temperature in the neighborhood of said evaporating device to electrically control the initiation of the successive distillings.

2. The method of producing refrigeration which consists in distilling a refrigerant from a generator absorber device and passing the distilled refrigerant into an evaporating device, passing the evaporated refrigerant into another generator absorber device, interrupting the first named distillation, distilling said absorbed refrigerant and passing it into the evaporating device while the evaporating refrigerant in said device is being passed to the first named generator absorber device, and utilizing the liquid level of the evaporating refrigerant to electrically control the initiation of the successive distillings.

3. The method of producing refrigeration which consists in distilling a refrigerant from a generator absorber device and passing the distilled refrigerant into an evaporating device, passing the evaporated refrigerant into another generator absorber device, interrupting the first named distillation, distilling said absorbed refrigerant and passing it into the evaporating device while the evaporating refrigerant in said device is being passed to the first named generator absorber device, and utilizing the liquid level of the evaporating refrigerant and the temperature in the neighborhood of said refrigerant to electrically control the initiation of the successive distillings.

4. In a refrigerating apparatus, in combination, a plurality of generator absorbers, a condensing chamber connected to each of said generator absorbers through a one way conduit, a refrigerating chamber and a one way conduit therefrom to said generator absorbers, a flow restricting device between said condenser and said refrigerating chamber, and electrical means controlled by the liquid level of the refrigerant for operating said generator absorbers in alternation to distill and maintain a supply of refrigerant in said refrigerating chamber.

5. In a refrigerating apparatus, in combination, a plurality of generator absorbers, a condensing chamber connected to each of said generator absorbers through a one way conduit, a refrigerating chamber and a one way conduit therefrom to said generator absorbers, a flow restricting device between said condenser and said refrigerating chamber, and electrical means controlled by the liquid level of the refrigerant and the temperature in the neighborhood thereof for operating said generator absorbers in alternation to distill and maintain a supply of refrigerant in said refrigerating chamber.

6. The method of producing refrigeration which consists in generating refrigerant to supply liquid refrigerant to an evaporating chamber and simultaneously absorbing gaseous refrigerant to produce evaporation in said chamber, and utilizing the level of the liquid in the evaporating chamber for controlling the generating of refrigerant.

7. The method of producing refrigeration which consists in periodically generating a refrigerant to supply liquid refrigerant to an evaporating chamber, and simultaneously absorbing gaseous refrigerant to produce evaporation of the liquid in said chamber and utilizing the level of liquid in the evaporating chamber for controlling the successive periods of distillation.

In testimony whereof I hereto affix my signature.

FREDERICK G. KEYES.